United States Patent [19]

Melancon

[11] 4,017,809
[45] Apr. 12, 1977

[54] MULTI-FREQUENCY OSCILLATOR CIRCUIT

[75] Inventor: Lionel P. Melancon, Oxnard, Calif.

[73] Assignee: The United States of America as represented by the Secretary of the Navy, Washington, D.C.

[22] Filed: July 25, 1975

[21] Appl. No.: 599,253

Related U.S. Application Data

[62] Division of Ser. No. 528,595, Dec. 2, 1974, Pat. No. 3,924,262.

[52] U.S. Cl. .............................. 331/179; 331/177 R
[51] Int. Cl.² ........................................ H03B 5/24
[58] Field of Search .......... 331/179, 47, 48, 108 R, 331/177 R; 244/77 D, 175, 181, 194

[56] References Cited

UNITED STATES PATENTS 3,668,553  6/1972  Dunn et al. .................... 331/179 X
3,693,110  9/1972  Briggs, Jr. et al. ............ 331/179 X
3,924,262  12/1975  Melancon ...................... 331/179 X Primary Examiner—Stephen G. Kunin
Attorney, Agent, or Firm—Richard S. Sciascia; Joseph M. St.Amand; Darrell E. Hollis

[57] ABSTRACT

A circuit for generating a first or a second A-C signal in response to a first and second switch. An oscillator circuit having two parallel capacitance networks and one resistance network which together determine the time constant for the frequency of oscillation of the first A-C signal is provided. When the first and second switch are "off" the first A-C signal is generated by said oscillator circuit. When the second switch is "on" an inverting amplifier in the oscillator circuit is electrically removed therefrom thereby electrically removing one of the parallel capacitance networks resulting in the oscillator circuit generating to second A-C signal.

2 Claims, 4 Drawing Figures

(a)

(b)

4,017,809

MULTI-FREQUENCY OSCILLATOR CIRCUIT

This is a division of application Ser. No. 528,595, filed Dec. 2, 1974, now U.S. Pat. No. 3,924,262.

BACKGROUND OF THE INVENTION

1. Field of the Invention

This invention relates generally to aircraft instruments and more particularly to an aural angle-of-attack warning system for aircraft use.

2. Description of the Prior Art

Most prior art angle-of-attack warning systems for aircraft employ mechanical indicating devices. Such devices are often inaccurate and lack the ability to call a dangerous situation to the pilot's attention immediately upon the aircraft's exceeding a specified angle-of-attack. In addition, they exhibit slow response times, are expensive, and often bulky.

SUMMARY OF THE INVENTION

The present invention is an aural angle-of-attack warning system for an aircraft. Accordingly, a single phase a-c signal from an aircraft's angle-of-attack transducer is converted into a d-c signal. The voltage level of the d-c signal is proportional to the amplitude of the a-c signal, which is proportional to the angle-of-attack of the aircraft. The d-c signal controls a pair of switches which control a pair of oscillators connected in series. The output of the second oscillator drives an aural device such as a loudspeaker. The switches determine which of two "beeping" tones the loudspeaker will emit.

OBJECTS OF THE INVENTION

Accordingly, it is one object of the present invention to provide an aural angle-of-attack warning system for an aircraft.

Another object of the present invention is to increase accuracy.

Another object of the present invention is to reduce cost while increasing efficiency.

Another object of the present invention is to reduce response time.

Still another object of the present invention is to reduce size.

Still another object of the present invention is to reduce cost.

Other objects and a more complete appreciation of the present invention and its many attendant advantages will develop as the same becomes better understood by reference to the following detailed description when considered in conjunction with the accompanying drawings in which like reference numerals designate like parts throughout the figures thereof and wherein.

DETAILED DESCRIPTION OF THE PREFERRED EMBODIMENT

Figure 1:
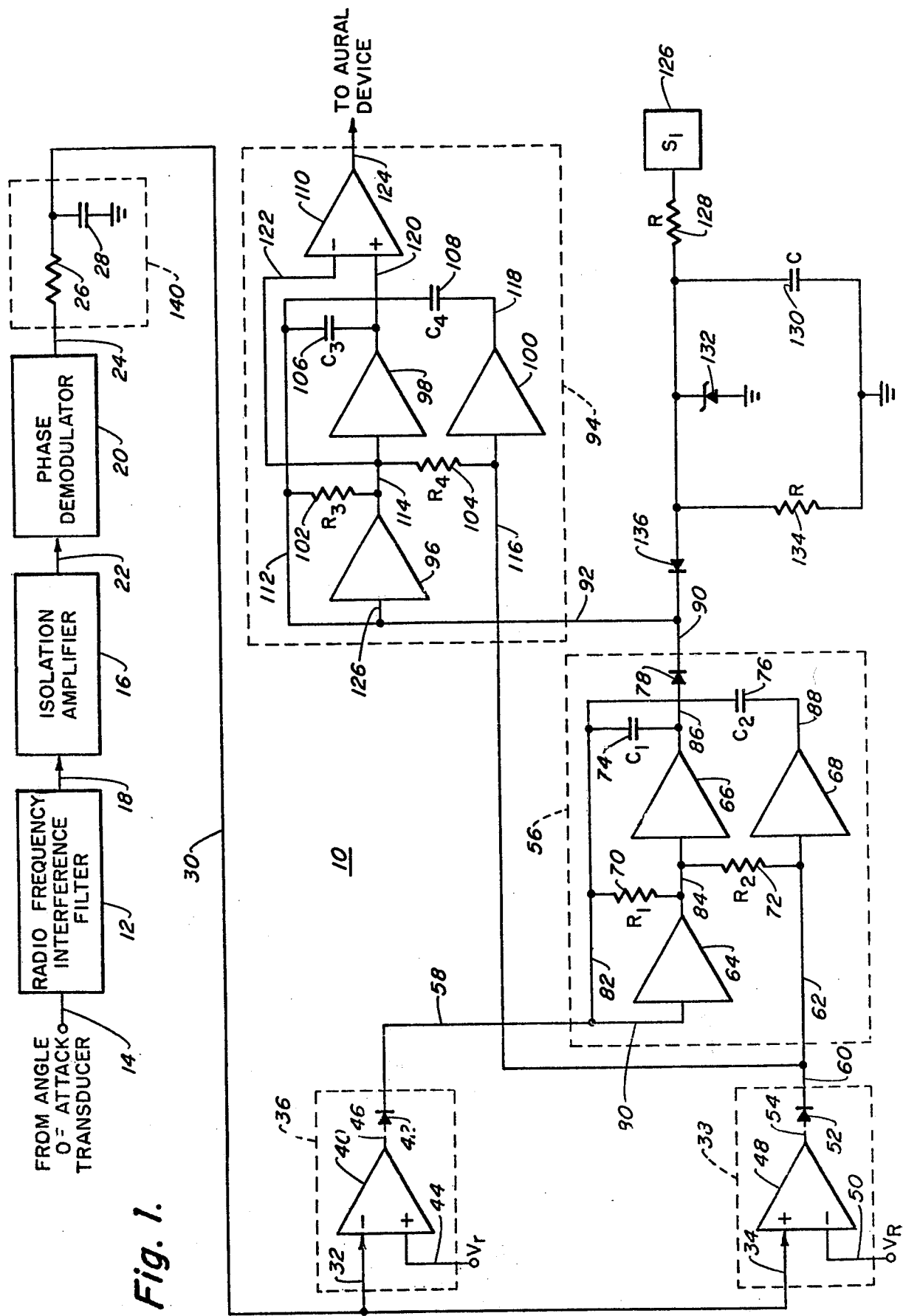
FIG. 1 is a schematic diagram of a specific embodiment of the present invention.

FIG. 1 illustrates an aural angle-of-attack warning device 10 according to the present invention for use on an aircraft. This aircraft is not shown.

The angle-of-attack transducer (not shown) excites a potentiometer (not shown) from a transformer (not shown) with a single phase a-c signal whose amplitude is proportional to the angle-of-attack of the aircraft. This a-c signal from the potentiometer inputs radio frequency interference filter 12 on line 14. Radio frequency interference filter 12 suppresses any radio frequency interference which might interfere with the proper operation of the integrated circuits utilized in device 10, which will be described supra.

The a-c signal inputs isolation amplifier 16 via line 18, and isolation amplifier 16 inputs phase demodulator 20 via line 22. The output of phase demodulator 20 on line 24 is a d-c signal whose voltage level is proportional to the amplitude of the a-c signal received on line 14. Thus, the voltage level of the d-c signal on line 24 is directly proportional to the angle-of-attack of the aircraft (not shown). As the angle-of-attack increases, so does the amplitude of the a-c signal on line 14.

Resistor 26 and capacitor 28 comprise a filter for smoothing the d-c signal on line 24. The smoothed d-c signal appears on line 30.

The d-c signal on line 30 inputs switch 36 via line 32 and switch 38 via line 34. Switch 36 comprises an operational amplifier 40 and diode 42. A first d-c reference voltage ($V_r$) inputs operational amplifier 40 via line 44. The output of operational amplifier 40 inputs diode 42 via line 46. It is noted that line 32 is the negative input while line 44 is the positive input to operational amplifier 40. The output of operational amplifier 40 on line 46 is the d-c signal on line 32 subtracted from the first d-c reference voltage on line 44. It is noted that if the d-c signal on line 46 is a negative voltage level, then diode 42 is open or switch 36 is "off". But, if the d-c signal on line 46 is a positive voltage level, then diode 42 is closed or switch 36 is "on". It is noted that the d-c voltage levels on lines 32, 44, 34 and 50 are positive d-c levels.

A second d-c reference voltage ($V_R$) inputs operational amplifier 48 via line 50. The output of operational amplifier 48 inputs diode 52 via line 54. It is noted that line 34 is the positive input while line 50 is the negative input to operational amplifier 40. The output of operational amplifier 48 on line 54 is the second d-c reference voltage on line 50 subtracted from the d-c signal on line 34. It is noted that if the d-c signal on line 54 is a negative voltage level, then diode 52 is open or switch 38 is "off". But, if the d-c signal on line 54 is a positive voltage level, then diode 52 is closed or switch 38 is "on".

Diode 42 is connected to interruption oscillator 56 via line 58 while diode 52 is connected to interruption oscillator 56 via lines 60 and 62 and to oscillator 94 via line 116.

Interruption oscillator 56 is comprised of inverting amplifiers 64, 66, and 68, resistors 70 and 72, capacitors 74 and 76, and diode 78. Line 58 is connected to line 80 and 82. Line 80 inputs inverting amplifier 64. Line 84 connects the output of inverting amplifier 64 to the input of inverting amplifier 66. Line 86 connects the output of inverting amplifier 66 to diode 78. Line 62 inputs inverting amplifier 68. Line 88 comprises the output of inverting amplifier 68. Resistor 70 is connected between line 82 and line 84. Resistor 72 is connected between line 84 and line 62. Capacitor 74 is connected between line 82 and line 86. Capacitor 76 is located between line 88 and line 82. Line 90 is the output of interruption oscillator 56. The signal on line 86 is an a-c signal which is half-wave rectified by diode 78. The half-wave rectified a-c signal appears on line 90 and inputs oscillator 94 via lines 90 and 92.

Oscillator 94 is comprised of inverting amplifiers 96, 98, and 100, resistors 102 and 104, capacitors 106 and 108, and operational amplifier 110. Line 126 inputs inverting amplifier 96 from line 92. Line 114 connects the output of inverting amplifier 96 to the input of inverting amplifier 98. Line 116 connects the input of inverting amplifier 100 to line 60. Line 118 is the output of inverting amplifier 100. Line 120 connects the output of inverting amplifier 98 to the positive input of operational amplifier 110. Line 122 connects line 114 to the negative input of operational amplifier 110. Line 124 is the output of oscillator 94 and operational amplifier 110. Output 124 is connected to an aural device such as a loudspeaker (not shown). Resistor 102 is connected between lines 114 and 112. Resistor 104 is connected between lines 114 and 116. Capacitor 106 is connected between lines 120 and 112. Capacitor 108 is connected between lines 118 and 112.

Weight-on-wheels switch 126, resistors 128 and 134, zener diode 132, capacitor 130, and diode 136 comprise a means for disabling oscillator 94 so that no aural driver signals appear on output 124.

The operation of device 10 of FIG. 1 is as follows. An a-c signal whose amplitude is proportional to the angle-of-attack of the aircraft (not shown) is received on line 14. The greater the amplitude of the a-c signal, the greater the angle-of-attack of the aircraft (not shown). This a-c signal is then converted into a d-c signal by phase demodulator 20 and smoothing filter 140. Phase demodulator 20 also keeps transients and other noise off line 24. The voltage level of the d-c signal is proportional to the amplitude of the a-c signal on line 14. Thus, the voltage level of the d-c signal on line 30 is directly proportional to the angle-of-attack of the aircraft (not shown).

Figure 2:
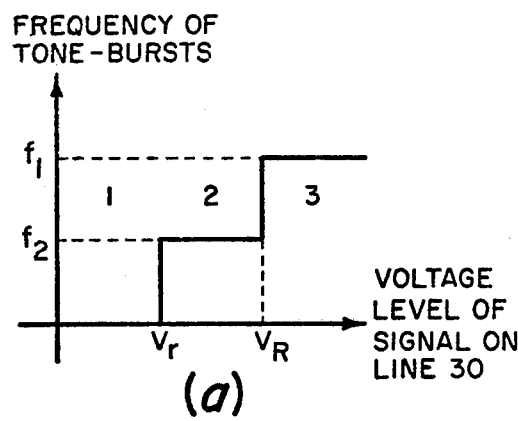
FIGS. 2(a) and (b) are graphs of the frequencies versus d-c voltage levels exhibited by the circuit described in FIG. 1.
Figure 2:
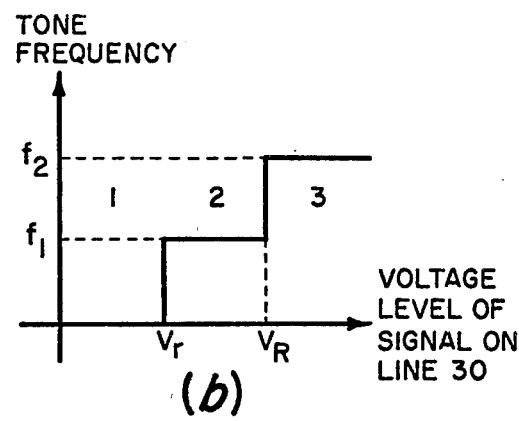

As noted in FIGS. 2(a) and (b), associated with switches 36 and 38, are a first d-c reference voltage ($V_R$) and a second d-c reference voltage ($V_R$). The voltage level of the first d-c reference voltage ($V_r$) is less than the voltage level of the second d-c reference voltage ($V_R$) as can be seen from FIGS. 2(a) and (b). Thus, there are three regions of operation associated with device 10. They are a region (region 1) in which the voltage level of the d-c signal on line 30 is less than the voltage level of the first d-c reference voltage ($V_r$), a region (region 2) in which the voltage level of the d-c signal on line 30 is between the voltage levels of the first and second d-c reference voltages, and a region (region 3) where the voltage level of the d-c signal on line 30 is greater than the voltage level of the second d-c reference voltage ($V_R$). Of course, the first and second d-c reference voltages represent specific first and second angles-of-attack of the aircraft (not shown), respectively.

In region 1, switch 36 is in the "on" position and switch 38 is in the "off" position. When switch 36 is "on", interruption oscillator 56 is disabled, thus no aural driver signal appears on line 124.

Figure 3:
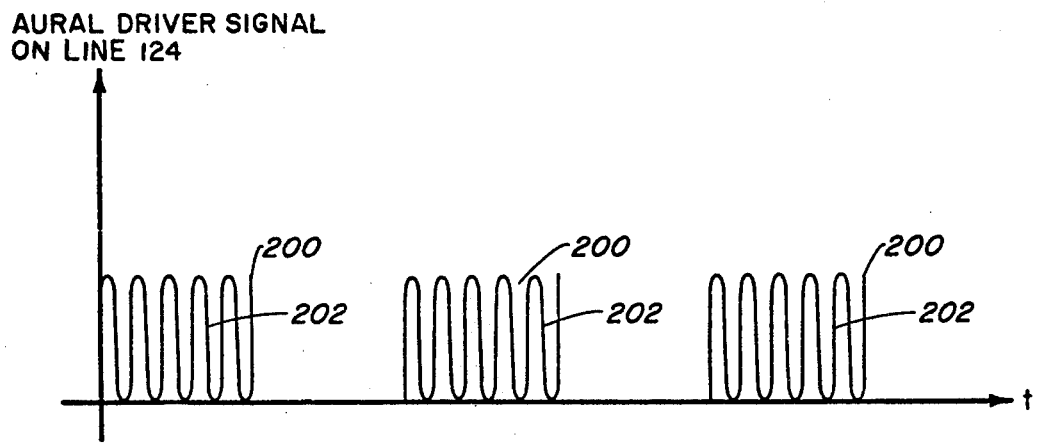
FIG. 3 is an illustration of the output of the circuit shown in FIG. 1.

However, when the voltage level of the d-c signal on line 30 is in region 2, diode 42 is open circuited or switch 36 is "off" because a negative d-c voltage will appear on line 46. When switch 36 is "off", interruption oscillator 56 is enabled, thus causing a first half-wave rectified a-c signal to appear on line 90. This first half-wave rectified a-c signal enables oscillator 94 on each position half-cycle. Thus, oscillator 94 outputs on line 124 a tone burst signal which has a tone burst frequency determined by oscillator 94 and a frequency of tone bursts determined by interruption oscillator 56. In region 2, the frequency of oscillation of interruption oscillator 56 is determined by resistor 70 and capacitors 74 and 76, while the frequency of oscillation of oscillator 94 is determined by resistor 102 and capacitors 106 and 108. Of course, the time constant determining the frequency of oscillation of interruption oscillator 56 is much longer than the time constant determining the frequency of oscillation of oscillator 94. FIG. 3 graphically illustrates this phenomenon. Note in FIG. 3 that the numeral 200 represents the frequency of tone bursts determined by interruption oscillator 56, while numeral 202 represents the tone burst frequency determined by oscillator 94.

When the voltage level of the d-c signal on line 30 moves into region 3 or exceeds the second d-c reference voltage ($V_R$), switch 38 is "on" because a positive d-c voltage level appears on line 54. Switch 36 remains "off". When switch 38 is on, it disables inverting amplifier 68 of interruption oscillator 56 via lines 60 and 62 and inverting amplifier 100 of oscillator 94 via lines 116, thus electrically removing capacitor 76 from interruption oscillator 56 and capacitor 108 from oscillator 94. This reduces the time constants of both interruption oscillator 56 and oscillator 94. Thus, in region 3 the frequency of tone bursts 200, as well as the tone burst frequency 202, are increased as is graphically illustrated in FIGS. 2A and 2B. Therefore, while in region 2 a pilot bears a "beeping" tone, in region 3, the pilot bears a "beeping" tone which beeps faster and at a higher tone.

Weight-on-wheels switch 126 when closed disables oscillator 94, thereby preventing device 10 from operating when the wheels of the aircraft (not shown) touch the runway.

It will be appreciated by those having ordinary skill in the art that the complete circuit diagram of FIG. 1 includes such suitable and necessary biasing voltage sources and filters as are usually provided in similar such circuits.

Obviously, numerous modifications and variations of the present invention are possible in light of the above teachings. It is therefore to be understood that within the scope of the appended claims the invention may be practiced otherwise than as specifically described herein.

I claim:
1. An oscillator circuit capable of generating a first or second a-c signal in response to a first and second switch comprising:
   a. a first inverting amplifier having an input and an output, said first inverting amplifier input being connected to said first switch;
   b. a first resistance network being connected between said first inverting amplifier input and said first inverting amplifier output;
   c. a second inverting amplifier having an input and an output, said second inverting amplifier input being connected to said first inverting amplifier output, said first or second a-c signal appearing on said second inverting amplifier output;

d. a first capacitance circuit being connected between said first inverting amplifier input and said second inverting amplifier output;

e. a third inverting amplifier having an input and an output;

f. a second capacitance circuit being connected between said first inverting amplifier input and said third inverting amplifier output, said first and second capacitance circuit and said first resistance network determining the time constant for the frequency of oscillation of said first a-c signal, said first a-c signal appearing on said second inverting amplifier output when said first switch is "off" and said second switch is "off";

g. a second resistance network being connected between said first inverting amplifier output and said third inverting amplifier input; and h. means connected to said third inverting amplifier for electrically removing said second capacitance circuit from said oscillator circuit when said first switch is "off" and said second switch is "on", thereby causing said second a-c signal to appear on said second inverting amplifier output.

2. The oscillator circuit of claim 1 wherein said removing means comprises an electrical connection between said second switch and said third inverting amplifier input such that when said second switch is "on", said third inverting amplifier is disabled, thereby electrically removing said second capacitance circuit from said oscillator circuit, said second a-c signal appearing on said second inverting amplifier output when said first switch is "off" and said second switch is "on".

* * * * *